United States Patent [19]

Sussman

[11] 4,097,020
[45] Jun. 27, 1978

[54] PLANT-WATERING DEVICE

[76] Inventor: Howard Sussman, c/o The Crackerbarrel, E. Shore Rd., Huntington, N.Y. 11743

[21] Appl. No.: 793,925

[22] Filed: May 5, 1977

[51] Int. Cl.² .................. B05B 1/30; F16K 7/06
[52] U.S. Cl. .................. 251/10; 24/115 R; 239/530; 251/284; 251/342
[58] Field of Search .......... 251/4, 9, 10, 342; 24/129 D, 260; 239/530

[56] References Cited

U.S. PATENT DOCUMENTS

| 827,640 | 7/1906 | Jessup | 251/10 |
| 3,100,102 | 8/1963 | De Haan | 251/9 |
| 3,517,909 | 6/1970 | Santomieri | 251/342 |
| 3,612,474 | 10/1971 | Strohl | 251/9 |
| 3,913,882 | 10/1975 | Moulet | 251/9 |
| 3,942,228 | 3/1976 | Buckman et al. | 251/10 |

Primary Examiner—Martin P. Schwadron
Assistant Examiner—Richard Gerard
Attorney, Agent, or Firm—Bauer, Amer & King

[57] ABSTRACT

Mounted adjacent the end of a plastic hose remote from its connection to a kitchen sink faucet or other such water source is an improved hose-pinching clamp assembly of the present invention which enables effective watering of remotely located plants. The significant improvement in performance is that the clamp, during normal watering service, is confined to providing a desirable "soft" stream by a pliable sleeve or tube in covering relation over the clamp, said tube maintaining the clamp partially closed upon the hose so as to restrict flow to said "soft" stream. Prior art clamps, in contrast, can inadvertently be opened too much, and may therefore operate with a watering stream that splashes or otherwise is unsuitable for the purposes intended.

4 Claims, 3 Drawing Figures

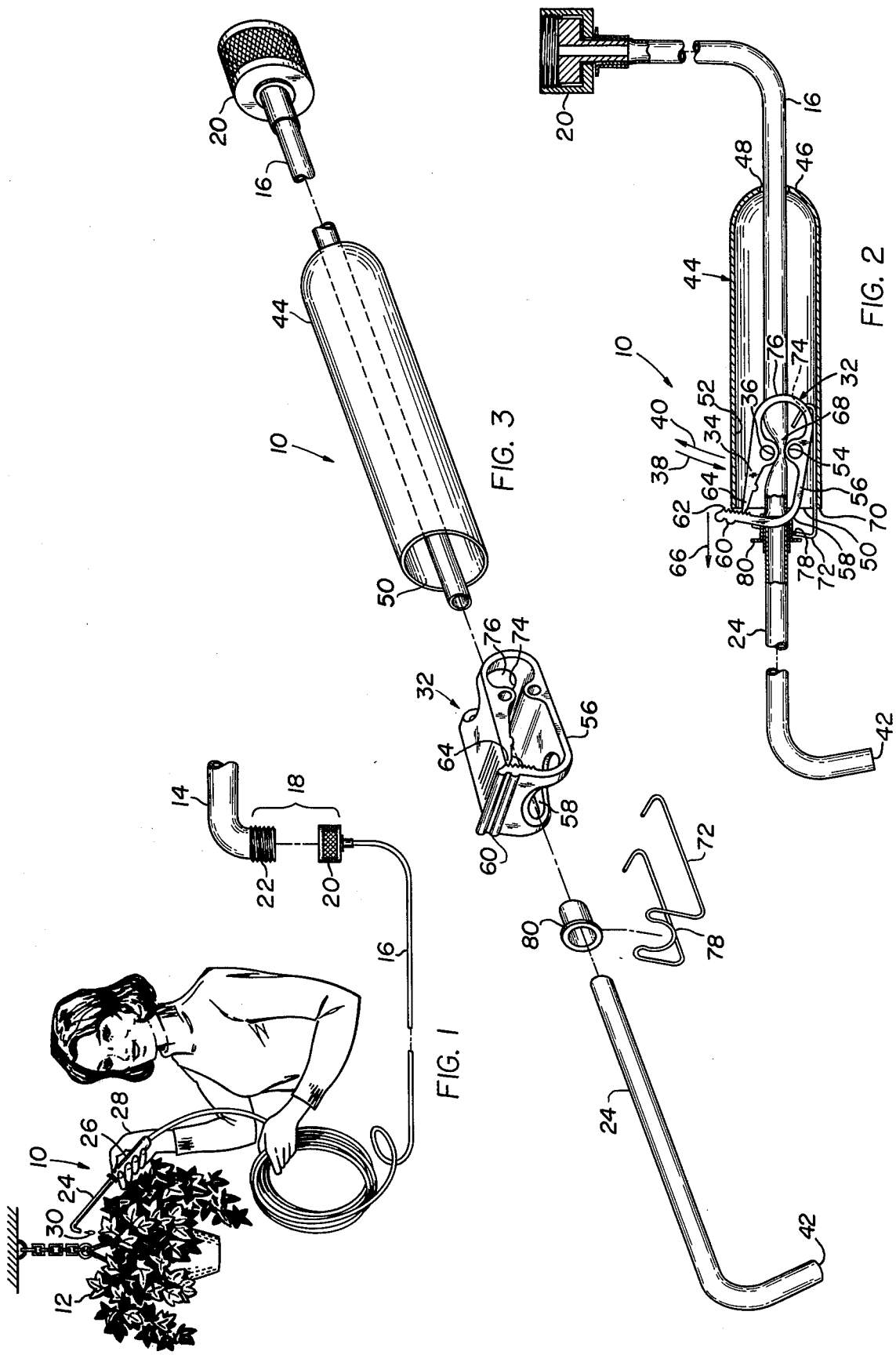

PLANT-WATERING DEVICE

The present invention relates generally to a household convenience device in the familiar form of a supply length of plastic hose attachable at one end to a kitchen sink faucet and, at its opposite end, effective to dispense water to remotely located plants or the like, and more particularly relates to improvements for the flow control clamp of such a device.

Plant-watering devices, as generally described above, are already known, and are a popular convenience item for the home. As presently constituted, a primary component is a hose-pinching clamp that has an operating range from fully open to movement closed upon the hose that provides total water shut-off. To undoubtedly permit use of the least expensive clamp, there is no further control exercised over the rate of flow of the exiting water other than that provided by said clamp. In some instances, therefore, as when the clamp is advertently fully opened and the pressure head too excessive, the dispensed water will discharge too rapidly causing splashing and other inconveniences for the user.

Broadly, it is an object of the present invention to provide an improved hose-pinching clamp for a plant-watering device overcoming the foregoing and other shortcomings of the prior art. Specifically, it is an object to provide a simple assembly using a conventional, economical hose clamp which obviates any possibility of the clamp losing controlling supervision over the flow rate of the water dispensed by the plant-watering device, thus significantly contributing to the utilitarian value thereof.

A plant-watering device of the type contemplated herein demonstrating objects and advantages of the present invention includes a clamp in its usual mounted position adjacent the watering end of the hose of the familiar type capable of partaking of closing movement upon said hose for causing corresponding selected restricted flow of water exiting from the hose. Disposed in covering relation over the clamp is an open ended tubular-shaped holding member, the diameter of said open end thereof being of a selected extent to normally hold the clamp in a position partially closed upon the hose so as to provide a desired restricted flow that obviates the exiting water from making splashing contact against a plant. Also, the construction material of the holding member is of a pliable plastic enabling an external pressure to be applied in an area of the holding member coextensive with the internal clamp which is effectively transmitted to the clamp. As a consequence, the clamp normally provides a desired restricted flow in the exiting water and further responds to external pressure applied through the pliable cover to close upon the hose and thereby provide complete shut-off of the water.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a perspective view illustrating typical use of a plant-watering device of which the within is an improved embodiment;

FIG. 2 is an isolated sectional view of the watering end of the device, on an enlarged scale, illustrating further structural details; and FIG. 3 is an exploded isometric view showing still further structural details.

Illustrated in FIG. 1 is a plant-watering device, generally designated 10, which facilitates the watering of plants 12 at a remote location from the water source, which typically is a conventional water spigot or faucet 14. As just generally described, and in many of its aspects, except those specifically noted to the contrary subsequently, the watering device 10 is a familiar household convenience item. In its conventional aspects it includes a supply length of flexible plastic hose 16 of a sufficient length to reach from its connected end, as at 18, established by threaded engagement of connector 20 with the threaded end 22 of spigot 14, to the remote location of a plant 12. At its free end, hose 16 typically terminates in a rigid plastic tube 24 which is inserted in the end of the hose 16, and there is further included a hose-pinching clamp, which is not shown in FIG. 1 but which will be understood to be located just inwardly of the rigid tube 24, as at 26. The referred to clamp is adapted to be held in the user's hand 28 and to be manipulated into selected degrees of movement closed upon the flexible hose 16 to provide corresponding restricted rates of flow of the water 30 exiting from the tube 24.

In further clarification of the foregoing description of the existing plant-watering devices, reference should be made to FIG. 2 in which there is shown a typical hose-pinching clamp, generally designated 32, mounted in its typical operative position adjacent the juncture of the hose 16 with the rigid plastic tube 24 or, as just noted in connection with FIG. 1, at said location 26. Clamp 32 will be described in detail subsequently, but at this point it suffices to note that it includes a first hose-contacting arm 34 which specifically includes a projection 36 depending therefrom which in response to closing movement 38 in the arm 34 causes corresponding pinching or clamping contact of the projection 36 against the hose 16. In the prior art, a full pivotal transverse 38 in the arm will be understood to be effective to cause complete shut-off of any water exiting from the tube 24, but what is more important, however, is that subsequent reverse direction or clamp-opening movement 40 in the arm 34 removes the control that is exercised by the clamp 32 over the flow rate through the hose 16. That is, if movement 40 is permitted to inadvertently occur to a greater extent that it should, the water being conveyed by the hose 16 will move past the projection 36 in such a volume and under such pressure that it will discharge too rapidly through the exit opening 42 of tube 24. This, in turn, will result in the exiting water splashing off of the plant 12 and onto surrounding objects, thereby detracting from the convenience in using the plant-watering device 10. It is one of the contributions of the present invention to provide an effective control over the clamp-opening movement 40 of clamp 32 so that during watering service of the device 10 there is a controlled exiting rate of flow from the tube 24 that is either a "soft" water stream, or a drop-by-drop flow rate.

The within inventive control referred to above is provided in significant part by a pliable plastic, preferably polyvinyl chloride, tubular member 44 which has an operative position in covering relation over the clamp 32. As illustrated in FIG. 2, the closed end 46 of the clamp covering or holding tube 44 has a small diameter opening 48 sized to allow the hose 16 to be projected therethrough and out of the opposite end large diameter opening 50 in order to complete its connection to the rigid plastic tube 24. Most important, and as illustrated in FIG. 2, the hose 16 is threaded also through the clamp 32 so that said clamp occupies an operative position within the open end 50 of the tube 44. One technique that may be employed to prevent shifting in the clamp 32 from this operative position in the opening 50 is to apply an adhesive at the interface of the surface of arm 34 that is in physical contact with the undersurface area, designated 52, of the tube 44 that is coextensive with the arm 34. Since the tube end 50 is in covering relation over the clamp 32, by proper selection of the diameter of the tube opening 50 it is possible to limit the extent of the clamp opening movement 40 so that it is not too excessive as will correspondingly result in too high pressure a stream of water to flow past the clamping obstruction 36. Stated another way, the diameter for the opening 50 of tube 44 is selected so that the farthest extent of clamp opening movement 40 allowed in the arm 34 nevertheless holds the clamp 32 in a partially closed condition upon the hose 16 and this, in turn, normally restricts flow past the obstruction 36 so that the exiting stream is of a desired slow rate for plant-watering purposes, i.e. a rate that minimizes splashing.

It should also be noted that despite the fact that tube 44 in its operative position in covering or holding relation over the clamp 32 normally provides a controlled rate of flow in the water exiting from the device 10, tube 44 nevertheless does not prevent appropriate manipulation of the clamp 32 as to provide for complete shut-off of the water. In this regard, the pliable construction material of the tube 44 does not prevent pressure applied externally on the tube in the direction 38 from being transmitted to the arm 34 to, in turn, result in said arm closing upon the hose 16 which causes the hose 16 to be pinched between the projection 36 and its cooperating opposite projection 54 provided on an opposite or opposing leg 56 of the clamp 32. As is best illustrated in FIG. 3, the clamp leg 56 has a front opening 58 therein through which the hose 16 is inserted to complete the connection thereof to the plastic tube 24 and, just beyond this opening, the clamp is embodied with a curvature which orients the free end of this leg, designated 60, substantially perpendicularly of hose 16, and thus also perpendicularly of the clamp arm 34. Accordingly, there is advantageously provided on the leg end 60 a friction surface 62, in the form of machined or molded ridges or the like, in facing relation to a pointed tip 64 in the arm 34, such that inter-engagement between the tip 64 and surface 62 results in the arm 34 being held in its various positions of closing movement upon the hose 16 including, of course, the fully depressed position in the direction 38 whch results in complete shut-off of the water. Release of hose 16 from this clamped position is obtained merely by pushing the upstanding clamp end 60 in the direction 66 which moves the friction surface 62 clear of the point 64, thereby allowing for clamp opening movement 40 to the extent permitted by the size of the tube opening 50.

The need to maintain control over the clamp opening movement 40 by means of the tube 44 as just described is not merely an alternative to control which otherwise could be provided by appropriate manipulation of the clamp 32. Rather, it has been found that in use, and under conditions of complete shut-off, that there is a build-up in water pressure adjacent the hose-pinching projections 36 and 54, as at 68, such that release movement 66 invariably is accompanied by movement of the pressure head 68 in between the projections 36 and 54 that causes, much like a wedge, these two projections to move abruptly apart. As a result, it cannot be expected that the user of the device 10 will always be able to exhibit enough dexterity over the rate or extent of clamp opening movement 40 in the clamp arm 34 to prevent flow of exiting water at an excessive rate. With the tube 44 in covering relation over the clamp 32, however, it is assured that clamp opening movement 40 will not exceed that amount as determined by the diameter size of the tube opening 50.

Supplementing any adhesive attachment between the arm 34 and the inner surface 52 of tube 44 in maintaining the operative position of the clamp 32 is the projection of friction surface 62 beyond the tube edge 70 which bounds the opening 50, it being readily apparent that this radial extension of surface 62 effectively prevents the clamp 32 from moving inwardly of the tube 44. The radial extension of surface 62 also in an obvious manner provides ready access for the moving of this surface in the direction 66 preparatory to releasing arm 44 from its condition clamping the hose 16.

To assist in maintaining the position of the clamp 32 in the tube opening 50, use is advantageously made of a wire member 72, which also acts somewhat as a spring in that, in its attached position to the clamp 32 as will soon be described, it cooperates with the clamp arm 34 in exerting an outward bias or urgency. Thus, the two legs of the wire member 72 may be thought of as exerting a slight pressure against the inner surface of tube 44 adjacent the opening 50 or in forcing the clamp arm 34 against the tube surface 52 and thus, in either case, contributing to the firmness in which the clamp 32 seats itself in the tube opening 50. Moreover, this firmness in position is maintained despite closing movement 38 in the arm 34 since the extent of this movement is compensated for by the urgency in the spring or positioning member 72.

As best illustrated in FIGS. 2, 3, the wire member 72 is a bifurcated construction wherein one end of the two legs thereof is positioned over an edge 74 of an opening 76 at the juncture of the clamp legs 34 and 56, said opening 76 accommodating the hose 16. The opposite end of the wire member 72 is bent into a U-shape, as at 78, so as to effectively receive in seated fashion therein a metal fitting or ferrule 80 used to provide a water tight connection between the interconnected ends of the plastic tube 24 and hose 16.

From the foregoing it should be readily appreciated that there has been described herein an improved plant-watering device 10 which during watering service has a desirable controlled flow rate in the water being dispensed therefrom, while providing all other performance requirements, such as maintaining complete water shut-off during movement by the user from one plant location to the next location requiring use of the device. While a preferred embodiment has been described, it will be understood that a latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. An improved device for watering a plant or the like at a location remote from a water source of the type including a flexible hose attached to convey water from said water source to the free end of said hose occupying an operative position in watering relation to said plant, said improvement comprising a clamp mounted adjacent said hose free end responsive to external pressure to partake of closing movement upon said hose for causing corresponding selected restricted flow of water exiting from said hose, and a tubular-shaped holding member disposed in covering relation over said clamp, said diameter of said tubular-shape thereof being of a selected extent to normally hold said clamp in a position closed upon said hose providing a desired restricted flow that obviates said exiting water from making splashing contact against said plant, and said construction material of said holding member being a pliable plastic sufficiently rigid to hold said clamp in said position to provide restricted flow and sufficiently pliable to enable an external pressure applied in an area of said holding member coextensive with said internal clamp to be transmitted to said clamp for effecting closing movement of said clamp, whereby said clamp normally provides a desired restricted flow in said exiting water and further responds to external pressure applied through said pliable cover to close upon said hose to provide complete shut-off of said water.

2. An improved clamp means for a plant-watering device as claimed in claim 1 wherein said tubular-shaped holding member is substantially closed at one end and open at its opposite end, said flexible hose being threaded through a cooperating small-diameter opening in said closed end and said clamp being held in a partially closed condition upon said hose by the edge of said holding member bounded said end opening thereof.

3. An improved clamp means for a plant-watering device as claimed in claim 2 including a spring attachment for said clamp disposed to cooperate therewith in exerting an outward bias in its attached condition to said clamp, whereby said outward bias contributes to maintaining said clamp in all conditions of closing movement thereof upon said hose in firm contact against the underside of said holding member.

4. An improved clamp means for a plant-watering device as claimed in claim 3 wherein said clamp includes a first hose-contacting arm oriented substantially longitudinally of said hose movable into and out of selected pinching contact with said hose for controlling the rate of flow of water through said hose, and a second arm oriented perpendicularly of said hose presenting a friction surface in facing relation to said hose-contacting arm for holding the same in any hose-pinching condition thereof, said second arm being sized to extend radially beyond said edge of said holding member open end to prevent inadvertent movement of said clamp from said operative position in said open end thereof inwardly of said holding member.

* * * * *

UNITED STATES PATENT AND TRADEMARK OFFICE
CERTIFICATE OF CORRECTION

PATENT NO. : 4,097,020
DATED : June 27, 1978
INVENTOR(S) : Howard Sussman

It is certified that error appears in the above-identified patent and that said Letters Patent are hereby corrected as shown below:

In Claim 2, column 6, line 6 "bounded" should be --bounding--.

Signed and Sealed this

Twenty-eighth Day of November 1978

[SEAL]

Attest:

RUTH C. MASON
*Attesting Officer*

DONALD W. BANNER
*Commissioner of Patents and Trademarks*